United States Patent
Hagan et al.

(10) Patent No.: US 6,767,584 B2
(45) Date of Patent: Jul. 27, 2004

(54) DISK SUBSTRATE WITH MONOSIZED MICROBUMPS

(75) Inventors: James A. Hagan, Rochester, MN (US); Ullal Vasant Nayak, San Jose, CA (US); Janice Blue Ostrom, Mazeppa, MN (US); Douglas Howard Piltingsrud, Eyota, MN (US); Douglas A. Kuchta, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 10/144,510

(22) Filed: May 13, 2002

(65) Prior Publication Data

US 2003/0211365 A1 Nov. 13, 2003

(51) Int. Cl.[7] .................................................. B05D 5/00
(52) U.S. Cl. ........................ 427/292; 427/290; 427/299; 427/352; 427/353; 427/397.7; 427/443.2
(58) Field of Search ................................ 427/292, 290, 427/299, 301, 352, 353, 443.2, 397.7

(56) References Cited

U.S. PATENT DOCUMENTS

| | | | | |
|---|---|---|---|---|
| 4,280,918 A | * | 7/1981 | Homola et al. | 252/62.51 R |
| 4,542,071 A | * | 9/1985 | Homola et al. | 428/428 |
| 4,624,892 A | * | 11/1986 | Ishizaki et al. | 428/323 |
| 4,816,933 A | * | 3/1989 | Izumi et al. | 360/55 |
| 6,063,470 A | * | 5/2000 | Zou et al. | 428/64.2 |
| 6,395,634 B1 | * | 5/2002 | Miyamoto | 438/691 |

* cited by examiner

Primary Examiner—Michael Barr
Assistant Examiner—Kirsten Crockford Jolley
(74) Attorney, Agent, or Firm—Wood, Herron & Evans, LLP; James R. Nock

(57) ABSTRACT

A method for texturing substrate surfaces and a substrate product, such as for computer disk drives. Microbump textured substrates are produced having a Rp value of about 20–200 Å and a ratio of Rmax:Rp of about 1.4 or less. In an exemplary embodiment, a microbump textured substrate is produced having colloidal particles on a surface thereof at a density of at least about 25 particles per 25 $\mu m^2$, wherein the surface topography includes a Rp value of about 20–200 Å, a micro-roughness Rq of about 10 Å or less, and a ratio of Rmax:Rp of about 1.4 or less. An exemplary method includes first providing a substrate surface having a surface micro-roughness Rq of about 10 Å or less and depositing colloidal particles on the surface to provide a Rp value of about 20–200 Å and a ratio of Rmax:Rp of about 1.4 or less. In a further exemplary embodiment, the method increases the micro-roughness Rq, but to a value that is still less than about 10 Å with Rmax:Rp still of about 1.4 or less.

48 Claims, 2 Drawing Sheets

DISK SUBSTRATE WITH MONOSIZED MICROBUMPS

FIELD OF THE INVENTION

This invention relates to disk drive data storage devices, and more particularly to the manufacture of substrates used in disk drive data storage devices.

BACKGROUND OF THE INVENTION

Disk drives for computers store data on magnetic recording disks, each including a substrate surface formed of glass, ceramic, glass-ceramic or oxidized metal. Transducer heads driven in a path toward and away from the drive axis write data to the disks and read data from the disks. During manufacture of the disks, the surfaces upon which data will be stored are ground and polished to provide a smooth surface. After cleaning the surfaces, the substrates are sputtered with a series of layers, for example a chrome underlayer, a magnetic layer and a carbon protection layer. The sputtered layers replicate the substrate surface morphology, creating either a smooth or a rough surface on the finished disk. A smoother surface topography on the substrate allows the head to fly closer to the disk, which produces a higher density recording. Glide height for some computer disk drive files is on the order of 20 nanometers (about 200 Å) and less, which is an extremely small interface distance.

In use, when the transducer head of the disk drive glides over the surface, it may crash into asperities in a rough or otherwise smooth surface that are higher than the glide clearance. This is known as a glide defect, which can ultimately cause file failure. A fatal head-disk crash may result in the loss of all data stored on the disk drive. Thus, there is a need to provide an asperity-free surface on magnetic recording disks to avoid head-to-disk crashes and thermal asperities which cause magnetic erasures.

In addition, to be competitive in the disk drive business, a reduction in cost per megabyte is needed, which is highly dependent upon an increase in aerial density. To increase the density requires lowering the fly height, or glide height, of the head. As the head-disk spacing is reduced and aerial density is increased, the magnetic recording disk generally needs an asperity-free/scratch-free surface to keep glide errors or head crash levels the same or lower than with previous disks, and to maintain or improve soft error rates, i.e., recoverable errors. A smoother surface topography includes lower Rq's, Rp's and Rmax, as measured by an atomic force microscope (AFM). Rq refers to the root mean square roughness, which designation of surface roughness is well-known in the art. Rp refers to the average height of the peaks above the average roughness. Rmax refers to the difference between the highest peak and the lowest valley, and is a measure of asperities and scratches.

However, with a very smooth disk, i.e., very low Rq and Rp's, there is significant flying instability and off-track forces that cannot be corrected by the file track positioning servo and that contribute to soft errors. As head-disk interfaces get smaller, such as around 80 Å or less, the surface attraction between surfaces increases, creating a pulling force that causes instability during flight of the transducer head. Thus, an asperity-free/homogeneous, smooth surface (low Rmax:Rp) is needed to accommodate low glide heights, yet a texture or roughness (Rq) is needed to avoid forces that create head instability and off-track errors. Current substrate finishing technologies cannot supply these competing needs of both low Rmax:Rp (<1.4) smoothness and high Rq (>3 Å) roughness on the same disk. Currently, an increase in Rq results in an increase in Rp and Rmax, and Rmax becomes significantly larger than Rp, thereby providing an inhomogeneous surface. When the surface is inhomogeneous, magnetic defects from thermal asperities and/or head-to-disk crashes occur.

It is thus desired to provide a method of manufacturing a substrate surface for a magnetic recording disk such that the Rq can be controlled independently from the Rp's and Rmax, and such that a substrate surface topography is provided having both a smooth and homogenous AFM peak distribution (low Rp and Rmax:Rp) of low enough values to allow low fly height without thermal asperities or head crashes, and a Rq of sufficient value to prevent forces that cause head flying instability and off-track errors, both of which increase the number of soft errors.

SUMMARY OF THE INVENTION

The invention addresses these and other problems associated with the prior art by providing a method for texturing magnetic disk substrates in which substrates are produced having an isotropic or anisotropic textured surface topography including a Rp value of about 20–200 Å and a ratio of Rmax:Rp of about 1.4 or less. In an exemplary embodiment, a glass substrate is produced having colloidal silica particles on a surface thereof at a density of at least about 25 particles per 25 $\mu m^2$, wherein the textured surface topography includes a Rp value of about 20–200 Å, a micro-roughness Rq of about 10 Å or less, and a ratio of Rmax:Rp of about 1.4 or less. An exemplary method of the invention includes first providing a smooth, isotropic substrate surface having a surface micro-roughness Rq of about 4 Å or less, and advantageously a micro-roughness Rq of about 2 Å or less, a Rp value less than about 20 Å, and a Rmax less than about 30 Å, and then depositing colloidal particles on the surface to alter the surface topography thereby providing a Rp value of about 20–200 Å and a ratio of Rmax:Rp of about 1.4 or less. In a further exemplary embodiment, the method increases the micro-roughness Rq, but to a value that is still less than about 10 Å. Another exemplary method of the invention includes first providing a textured, anisotropic substrate surface having a surface micro-roughness Rq of about 10 Å or less, and advantageously a micro-roughness Rq of about 7 Å or less, a Rp value less than about 30 Å, and a Rmax less than about 85 Å, and then depositing colloidal particles on the surface to alter the surface topography thereby providing a Rp value of about 20–200 Å and a ratio of Rmax:Rp of about 1.4 or less.

These and other advantages and features, which characterize the invention, are set forth in the claims annexed hereto and forming a further part hereof. However, for a better understanding of the invention, and of the advantages and objectives attained through its use, reference should be made to the accompanying Detailed Description, in which there is described exemplary embodiments of the invention.

DETAILED DESCRIPTION

Figure 1A:
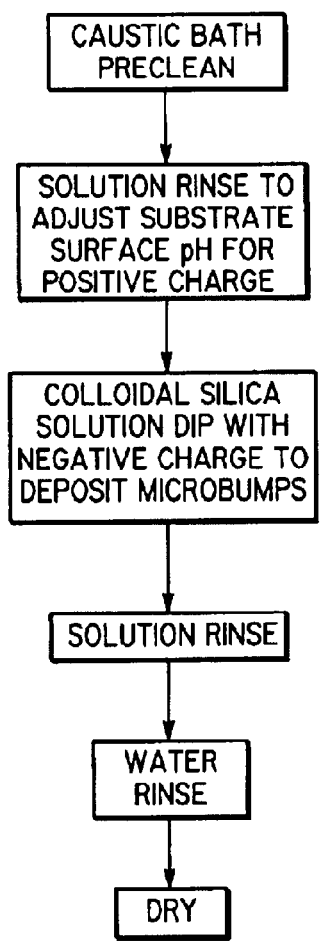
FIG. 1A is a flow diagram of a charge texturing method consistent with the invention in which aluminum ions are the plus charge on a glass substrate and colloidal silica is the negative charge.

The present invention provides a magnetic disk substrate with improved soft error rates and improved flying characteristics. To this end, a disk substrate surface is first polished to a smooth superfinish or textured low Rq finish. A smooth superfinish generally refers to an isotropic surface that exhibits a surface micro-roughness Rq of about 4 Å (0.4 nm) or less and advantageously about 2 Å (0.2 nm) or less, a Rp value of less than about 20 Å (2 nm), and a Rmax of less than about 30 Å (3 nm). A textured low Rq finish refers to an anisotropic surface that exhibits a surface micro-roughness Rq of about 10 Å (1 nm) or less, and advantageously about 7 Å (0.7 nm) or less, a Rp value of less than about 30 Å (3 nm), and a Rmax of less than about 85 Å (8.5 nm), and advantageously less than about 45 Å (4.5 nm). The initial Rmax:Rp for both types of substrate surfaces, polished or textured, is 1.5 or greater, which is an inhomogeneous peak distribution. In accordance with the present invention, a plurality of colloidal particles, such as spherical colloidal oxide particles, are then deposited on the polished/textured surface to alter the Rp value to between about 20 Å (2 nm) and about 200 Å (20 nm). The Rmax:Rp ratio is decreased to about 1.4 or less, which is a homogeneous peak distribution. This microbump texturing method of the present invention provides a way to control micro-roughness, as measured by AFM Rq, independently from peak heights as measured by AFM Rp and Rmax.

The microbump texturing method starts with a low waviness, superfinish glass or textured glass, ceramic, glass-ceramic, or oxidized metal substrate surface and deposits particles, advantageously colloidal spheres, of silica, alumina, alumina-coated silica, or other colloidal particles or combinations of these particles of a selected size with an area density optimum for the magnetic and head characteristics. Two general exemplary methods in accordance with the present invention may be used for the colloidal particle deposition, namely, the opposite-charge method and the no-charge method, though the invention is not so limited. The opposite-charge method involves putting an opposite charge on the disk surface versus the colloidal particles to create a charge difference, such as putting a positive charge on a glass substrate and dipping the positively charged glass in a negatively charged colloidal silica (both zeta potentials greater than zero, positive or negative charge). The no-charge method involves adjusting the colloidal particles and disk surface pH to have the same or no charge (isoelectric point, zeta potential of zero), then placing the disk in the colloid and letting the random thermal motion (Brownian motion which along with concentration controls the collision frequency) and the collision efficiency factor determine the rate of deposition.

In both methods, the colloidal particle concentration and deposition time may be used to help control the population density of the depositing particles along with disk surface and colloid preconditioning. Selection of the colloidal particles, such as colloidal silica spheres, controls the size of AFM Rp's deposited and thus the Rp value, which determines the Rq range possibilities. These methods may be performed using glass substrate surfaces, glass-ceramic substrate surfaces, ceramic substrate surfaces or oxidized metal substrate surfaces. Each particle forms a microbump having a height value. Use of colloidal spheres with a narrow size distribution increases the homogeneity of the surface topography by providing consistent Rp values. Spherical particles having an average diameter of about 20–2000 Å are contemplated by the method of the present invention, and advantageously having an average diameter of about 20–70 Å.

Each microbump texturing process is designed for the particular substrate and colloid involved based on their surface characteristics. The pH ranges selected have a dependence on surface composition, whether it is the surface of the disk substrate or the surface of the colloid. For example, silica has an isoelectric point of about 2.5. Thus, a glass substrate surface having a pH of about 2 to less than 3 will have no significant charge, i.e., a zeta potential of zero, just like the colloidal silica at the same pH. An alumino-silicate glass substrate surface having a pH in the range of about 3 up to near its isoelectric point (within ±about 0.5 pH units) will have a positive charge and colloidal silica at the same pH $\geq 3$ a negative charge, i.e., both zeta potentials greater than zero. It may be appreciated that within about 0.5 pH units of the isoelectric point, there is essentially no charge on either side. Thus, for opposite-charge methods described, the substrate surface is adjusted to have a pH of about $\geq 0.5$ units to the acid side of its isoelectric point (a positive charge) and the colloidal particles to about $\geq 0.5$ pH units to the base side of their isoelectric point (a negative charge). Advantageously, both pH's are adjusted to be substantially identical to help prevent shocking of the colloidal dispersion when the substrate is dipped in the colloidal solution. Though silica and glass are used in the examples herein, it should be understood that the same method may be employed with other materials, such as colloidal alumina particles and ceramic, glass-ceramic or oxidized metal substrate surfaces, by identifying the isoelectric points of the colloidal particles and substrate surfaces and adjusting the surface pH's to either create an opposite-charge (zeta potential>0) or create no charge (zeta potential=0). A method could also be used in which one surface pH is adjusted to create no charge, and the other surface pH is adjusted to create a positive or negative charge.

The following is an example of a general opposite-charge method (zeta potential>0) in which a positive charge is placed on a glass disk and a negative charge on colloidal silica. For the charge method on an alumino-silicate glass, the following conditions may be used for the deposition mechanism using alumino-silicate glass as the plus charge substrate and pure colloidal silica as the negative charge:

Step 1—pre-clean the disk in a caustic bath having a pH of about 9.5–12.5 and a temperature of about 50–70° C. for a time of about 0.5–20 minutes. Ultrasonics may be used for the bath.

Step 2—dip rinse the disk in one or more solutions having a pH in the range of about 3 up to about 0.5 pH units to the acid side of the isoelectric point for the alumino-silicate glass, for example about 3.0–4.5, and a temperature of about 20–70° C. for a time of about 3–20 minutes.

Step 3—dip the disk in a solution of colloidal silica of a desired size, shifted to the same pH as the rinse solution in step 2 using an ion exchange resin and an organic acid as required, for a time of about 5–120 minutes, with a silica concentration of about 1% of the as received solution up to 100% of the as received solution. Alternatively, the colloidal silica solution may be adjusted to have a pH greater than the pH of the Step 2 rinse solution, for example about 4.6–11.

Step 4—rinse the disk in one or more consecutive solutions having the same pH as in step 3 and a temperature of about 20–100° C. for a time of about 3–5 minutes. Ultrasonics may be used for the rinse.

Step 5—rinse the disk one or more times in deionized water and spin dry or vapor dry the disk.

The basic steps for the above opposite-charge method are depicted schematically in FIG. 1A. Ultrasonics as referred to herein refers to mixing by introducing a frequency of about 40–72 kHz to the bath solution or water rinse to produce cavitation (i.e. imploding bubbles).

For the opposite-charge method (zeta potential>0) on alumino-silicate glass, the following conditions may be used for the deposition mechanism using iron as the plus charge ion and pure colloidal silica as the negative charge:

Step 1—pre-clean the disk in a caustic bath having a pH of about 9.5–12.5 and a temperature of about 50–70° C. for a time of about 0.5–20 minutes, then rinse the disk one or more times in either deionized water or an acidic solution having a pH of about 1.5–3.0, the rinse solution having a temperature of about 20–70° C., for a time of about 3–20 minutes. Ultrasonics may be used for the bath and/or rinse.

Step 2—dip the disk in a 0.001–0.00001M ferric chloride solution having a pH of about 1.5–3.0 for a time of about 3–30 minutes.

Step 3—dip rinse the disk in one or more acidic solutions having the same pH as the solution in step 2 and a temperature of about 20–70° C. for a time of about 3–20 minutes, then rinse the disk one or more times in deionized water having a temperature of about 20–70° C. for a time of about 3–20 minutes. Ultrasonics or megasonics may be used for the rinse.

Step 4—dip rinse the disk in one or more solutions having a pH greater than about 0.5 pH units to the acid side of the isoelectric point for iron, for example about 3.0–4.5, using an acid as necessary to adjust the pH, and having a temperature of about 20–100° C. for a time of about 3–5 minutes. Ultrasonics may be used for the rinse.

Step 5—dip the disk in a solution of colloidal silica of a desired size, shifted to the same pH as the rinse solution in step 4 using an ion exchange resin and/or an acid as required, for a time of about 5–120 minutes with a silica concentration of about 1% of the as received solution up to 100%. Alternatively, the colloidal silica solution may be adjusted to have a pH greater than the pH of the Step 4 rinse solution, for example about 4.6–11.

Step 6—rinse the disk in one or more consecutive solutions having the same pH as in step 5 and a temperature of about 20–100° C. for a time of about 3–5 minutes. Ultrasonics may be used for the rinse.

Step 7—rinse the disk one or more times in deionized water and spin dry or vapor dry the disk.

Figure 1B:
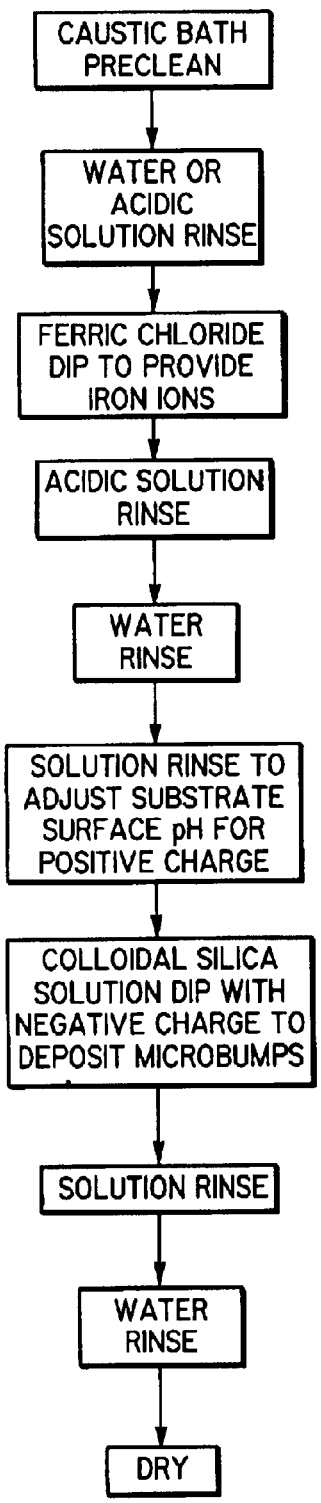
FIG. 1B is a flow diagram of a charge texturing method consistent with the invention in which iron ions are the plus charge on a glass substrate and colloidal silica is the negative charge.

The basic steps for the above opposite-charge method are depicted schematically in FIG. 1B. While iron ions have been described as the plus charge ion, it may be appreciated that other metal ions may be used, for example, aluminum, cerium, zirconium, titanium, tin, chromium, nickel, manganese, zinc, gallium, yttrium, cobalt, copper, barium, strontium, calcium and magnesium.

For an alumino-silicate glass, the following conditions may be used for the no-charge (zeta potential=0) deposition mechanism using pure colloidal silica:

Step 1—pre-clean the disk in a caustic bath having a pH of about 9.5–12.5 and a temperature of about 50–70° C. for a time of about 0.5–20 minutes. Ultrasonics may be used for the bath.

Step 2—dip rinse the disk in one or more acidic solutions having a pH in the range of about 2.0 to less than about 3.0 and a temperature of about 20–70° C. for a time of about 3–20 minutes.

Step 3—dip the disk in colloidal silica of a desired size, shifted to the same pH as the rinse solution in step 2 using an ion exchange resin and/or an acid as required, for a time of about 5–120 minutes with a silica concentration of about 1% of the as received solution up to 100%.

Step 4—rinse the disk in one or more consecutive acidic solutions having the same pH as in steps 2 and 3 and a temperature of about 20–100° C. for a time of about 3–5 minutes. Ultrasonics may be used for the rinse.

Step 5—rinse the disk one or more times in deionized water and spin dry or vapor dry the disk.

Figure 1C:
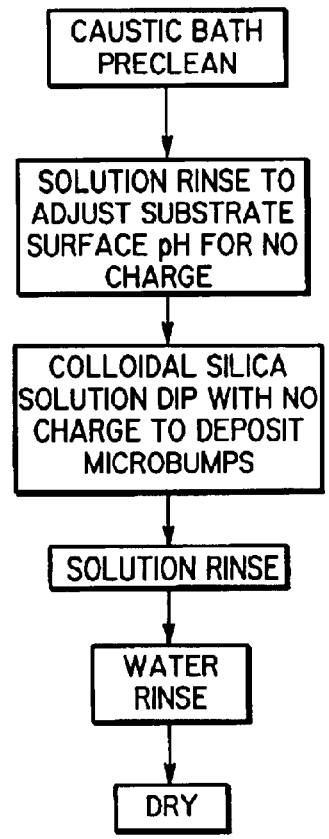
FIG. 1C is a flow diagram of a no-charge texturing method consistent with the invention in which a glass substrate and colloidal silica are at or near their isoelectric point, i.e., no-charge point.

The basic steps for the above no-charge method are depicted schematically in FIG. 1C.

An exemplary microbump deposition method may thus be generally described by the following steps:

Step 1—pre-clean the substrate surface in a caustic bath having a first pH of about 9.5–12.5.

Step 2—rinse the substrate surface in one or more solutions having a second pH greater than about 0.5 pH units to the acid side of the isoelectric point of the substrate surface or deposited plus charge ion for a charge method, or a second pH within about 0.5 pH units of the isoelectric point of the substrate surface for a no-charge method.

Step 3—dip the substrate surface in a colloidal particle solution having a third pH ≧ the second pH, for example about 2–11.

Step 4—rinse the substrate surface consecutively in one or more solutions having the third pH.

Step 5—rinse the substrate surface one or more times in deionized water and dry the substrate surface.

To use a metal that is not part of the substrate surface composition as the plus charge ion, steps are added between steps 1 and 2, including a deionized water rinse or acidic solution rinse, then consecutive dips in a metal ion-containing solution and an acid solution each at a pH sufficient to deposit or precipitate the metal ions on the substrate surface, for example about 1.5–3 for iron, and then a deionized water rinse. To avoid shocking the substrate surface, step 1 is advantageously followed by an acidic solution rinse at the same or similar pH as that to be used for the metal ion-containing solution. The second pH of step 2 is adjusted to greater than about 0.5 pH units to the acid side of the metal ion isoelectric point. The third pH for the colloidal particle solution in an opposite-charge method may be equal to or greater than the second pH, and advantageously is equal to the second pH to help prevent shocking of the colloidal dispersion during step 3. For a no-charge method, the second pH is adjusted to within about 0.5 pH units of the substrate surface isoelectric point, and the third pH is adjusted to within about 0.5 pH units of the colloidal particle surface isoelectric point.

In each of the above microbump texturing methods of the present invention, a superfinish substrate surface or diamond textured low Rq substrate surface is first provided. A superfinish substrate surface is generally understood to have a smooth, isotropic surface topography with micro-roughness Rq of about 4 Å (0.4 nm) or less, a Rp value of less than about 20 Å (2 nm), and a Rmax of less than about 30 Å (3 nm). A diamond textured low Rq substrate surface has a textured, anisotropic surface topography with microroughness Rq of about 10 Å (1 nm) or less and advantageously about 7 Å (0.7 nm) or less, a Rp value of less than about 30 Å (3 nm), and a Rmax of less than about 85 Å (8.5 nm) and advantageously less than about 45 Å (4.5 nm). Both the superfinish and diamond textured substrate surfaces have an initial Rmax:Rp of 1.5 or greater. By the texturing method of the present invention, such as by either an opposite-charge or no-charge deposition method, the surface topography is altered to have a Rp value in the range of about 20 Å (2 nm) to about 200 Å (20 nm), advantageously with a bump or particle density of at least about 25 microbumps per 25 $\mu m^2$ surface area. Advantageously, the ratio of Rmax to Rp is decreased to about 1.4 or less, thereby providing good surface uniformity or homogeneity. An increase in micro-roughness Rq is observed following the texturing treatment. Advantageously, Rq is maintained below about 10 Å (1 nm). By the method of the present invention, Rq's are controlled by design and can be increased, yet low Rmax's and homogeneous Rp's are provided such that the Rmax:Rp ratio remains low so the magnetic disk substrate exhibits improved soft error rates from head flying stability and reduced off-track disturbances (result of designed Rq) with improved low flying characteristics, fewer thermal asperities and fewer head crashes (result of low Rmax:Rp) instead of a trade-off between one or the other, as in prior magnetic disk substrates.

EXAMPLES

The surface topography for several magnetic disk substrates were analyzed with an atomic force microscope (AFM), wherein four of the disk substrates are comparative examples of disk substrates of the prior art and four of the disk substrates were prepared in accordance with a method of the present invention. Table 1 provides the surface roughness characteristics for each of the eight disk surfaces, including Rq, Rp, Rmax and Rmax:Rp. Comparative disks 1, 2, 3 and 4 correspond to an 18 nm fly height (FH) disk substrate prepared in accordance with current standard market production, an 8 nm FH superfinish glass substrate, an 18 nm FH disk substrate having an anisotropic diamond texture, and a 10 nm FH disk substrate having an anisotropic diamond low Rq texture, respectively. Example microbump textured disks 1–4 were prepared in accordance with the invention as described in detail below to have an isotropic colloidal silica texture using 70 Å (7 nm) diameter silica spheres.

TABLE 1

| Surface Finish Type on Glass Substrate | AFM Rq in Å (in nm) | AFM Rp in Å (in nm) and Bump Density/25 $\mu m^2$ | AFM Rmax in Å (in nm) | AFM Rmax:Rp (surface uniformity) |
|---|---|---|---|---|
| Comparative Disk 1: Current Standard Market Production for 18 nm FH | 6.5 (0.65) | 35 (3.5) N/A | 90 (9.0) | 2.6 |
| Comparative Disk 2: Superfinish Glass for 8 nm FH | 2 (0.2) | 14.1 (1.41) N/A | 22.7 (2.27) | 1.6 |
| Comparative Disk 3: Anisotropic Diamond Texture for 18 nm FH | 10.2 (1.02) | 28.3 (2.83) N/A | 86.9 (8.69) | 3.1 |
| Comparative Disk 4: Anisotropic Diamond Texture for 10 nm FH | 6.5 (0.65) | 24.7 (2.47) N/A | 37.1 (3.71) | 1.5 |
| Isotropic Colloidal Silica Textured Disk 1 (Nom. 70 Å Colloidal Silica Used) | 7.72 (0.772) | 79 (7.9) 225 (22.5) | 89 (8.9) | 1.1 |
| Isotropic Colloidal Silica Textured Disk 2 (Nom. 70 Å Colloidal Silica Used) | 4.29 (0.429) | 79 (7.9) 60 (6) | 88 (8.8) | 1.1 |
| Isotropic Colloidal Silica Textured Disk 3 (Nom. 70 Å Colloidal Silica Used) | 5.1 (0.51) | 101 (10.1) 50 (5) | 126 (12.6) | 1.2 |
| Isotropic Colloidal Silica Textured Disk 4 (Nom. 70 Å Colloidal Silica Used) | 3.29 (0.329) | 81 (8.1) 27 (2.7) | 90 (9) | 1.1 |

Example 1

The example textured disk 1 was prepared by the opposite-charge method using a ready-to-sputter superfinished 95 mm glass disk having the surface topography characteristics of comparative disk 2, i.e., the superfinish disk. The disk was dipped for about 4 minutes in a 72 kHz ultrasonic caustic bath having a pH of about 12.5 and a temperature of about 68° C., followed by rinsing the disk by dipping it in two consecutive pH 4.5 acetic acid solutions for about 5 minutes each. Next, the disk was dipped for about 30 minutes in a 4% by volume LUDOX® SM solution (a colloidal silica solution available commercially from W. R. Grace and Co., Columbia, Md.) (4% by volume referring to the concentration of as received solution rather than the amount of active ingredient) wherein the solution was adjusted to a pH of 4.5 using AMBERLITE® IR-120 ion exchange resin (available commercially from VWR, Chicago, Ill.). Thus, the disk had a positive zeta potential greater than zero and the colloidal silica had a negative potential greater than zero. The disk was then rinsed by dipping in a pH 4.5 acetic acid solution for about 3 minutes, followed by dipping for about 3 minutes in a pH 4.5 acetic acid 72 kHz ultrasonics bath. The disk was then further rinsed by two consecutive 3 minute rinses in deionized water and an automated Oliver cleaner three tank cascade deionized water rinse and rinse spin dry.

Example 2

The example textured disk 2 was prepared by the opposite-charge method starting with the same ready-to-sputter superfinished 95 mm glass disk having the surface topography characteristics of comparative disk 2 and dipping the disk for about 4 minutes in a 72 kHz ultrasonic caustic bath having a pH of about 12.5 and a temperature of about 68° C. The disk was then rinsed by dipping in two consecutive deionized water baths for about 2 minutes each. The disk was then immediately dipped in two consecutive baths of pH 3.5 acetic acid solution for about 5 minutes each. Next, the disk was dipped for about 30 minutes in a 4% by volume LUDOX® SM solution wherein the solution was adjusted to a pH of 3.5 using the AMBERLITE® IR-120 ion exchange resin. Thus, the disk had a positive zeta potential greater than zero and the colloidal silica had a negative potential greater than zero. The disk was then rinsed by dipping in a pH 3.5 acetic acid solution for about 3 minutes, followed by dipping for about 3 minutes in a pH 3.5 acetic acid 72 kHz ultrasonic solution. The disk was then further rinsed by two consecutive 3 minute rinses in deionized water, and an automated Oliver cleaner three tank cascade deionized water rinse and rinse spin dry.

Example 3

The example textured disk 3 was prepared by the opposite-charge method starting with the same ready-to-sputter superfinished 95 mm glass disk having the surface topography characteristics of comparative disk 2 and dipping the disk for about 4.5 minutes in a 72 kHz ultrasonic caustic bath having a pH of about 12.5 and a temperature of about 68° C. The disk was then rinsed by dipping in three consecutive deionized water baths for about 3 minutes each, then immediately dipped for about 10 minutes in a 0.001M ferric chloride solution having the pH adjusted to about 2.5 using nitric acid. Next, the disk was immersed for about 5 minutes in a nitric acid deionized water solution having a pH of about 2.5, then rinsed by dipping in a deionized water bath for about 3 minutes. Surface conditioning was accomplished by dipping the disk in two consecutive tanks of acetic acid solution having a pH of about 3.5 for about 3 minutes each, the first solution having no ultrasonics and the second solution having 72 kHz ultrasonics. Colloidal texture was then deposited by immersing the disk for 5 minutes in a 2% by volume LUDOX® SM solution adjusted to a pH of 3.5 using the AMBERLITE® IR-120 ion exchange resin and acetic acid. Thus, the disk had a positive zeta potential greater than zero and the colloidal silica had a negative potential greater than zero. The disk was then rinsed by dipping in a pH 3.5 acetic acid solution for 3 minutes followed by dipping for 3 minutes in a pH 3.5 acetic acid 72 kHz ultrasonic solution. The disk was further rinsed by an automated Oliver cleaner three tank cascade deionized water rinse and rinse spin dry.

Example 4

The example textured disk 4 was prepared by the no-charge method starting with the same ready-to-sputter superfinished 95 mm glass disk having the surface topography characteristics of comparative disk 2 and dipping the disk for about 4 minutes in a 72 kHz ultrasonic caustic bath having a pH of about 12.5 and a temperature of about 68° C. The disk was then rinsed by dipping in two consecutive deionized water baths for about 2 minutes each, then immediately dipped in two consecutive pH 2.5 acetic acid solutions for about 5 minutes each (whereby aluminum ions were removed from the surface). Next, the disk was dipped for about 5 minutes in an 88% by volume LUDOX® SM solution adjusted to a pH of 2.5 using AMBERLITE® IR-120 ion exchange resin. Thus, both disk and colloidal silica were at or near their isoelectric point where the zeta potential is zero. The disk was then rinsed by dipping in a pH 2.5 acetic acid solution for about 3 minutes, followed by dipping for about 3 minutes in a pH 2.5 acetic acid 72 kHz ultrasonic bath. The disk was further rinsed by two consecutive 3 minute rinses in deionized water, and an automated Oliver cleaner three tank cascade deionized water rinse and rinse spin dry.

Each of the comparative disks have a Rmax:Rp ratio of 1.5 or greater, and as high as 3.1 and 2.6 for the diamond texture and current production disks, respectively. Thus, the surface is inhomogeneous, which will cause a percentage of the heads to crash into asperities on the surface, thereby causing glide and magnetic errors, and ultimately file failure. The head on a superfinish disk is subject to instability due to the low Rq roughness of its surface. The comparative disks do not provide a surface finish that is both Rq rough and Rmax:Rp smooth together.

By the microbump texturing process of the present invention, a low Rq is maintained, advantageously below about 10 Å (1 nm), while creating a homogeneous roughness in which the Rp value is between 20 Å (2 nm) and 200 Å (20=n) and the Rmax to Rp ratio is low, advantageously less than about 1.4. In each of the examples of the present invention, the Rmax to Rp ratio, which is an indication of surface uniformity, is 1.1 to 1.2. In an exemplary embodiment of the present invention, the surface finish includes a Rq between about 3 and about 9 Å, a Rp value between about 30 and about 100 Å with a bump density between about 25 and about 500 microbumps per 25 $\mu m^2$, and a Rmax:Rp ratio less than about 1.4. It may be appreciated, however, that the potential and desired bump density is dependent upon the size of the colloidal particles. While in each of the examples the microbump textured disks 1–4 were produced by starting with a superfinished comparative disk 2, the present invention also contemplates starting with a diamond textured low Rq comparative disk 4 or any other smooth or textured surface having a Rq of about 10 Å (1 nm) or less. Magnetic disk substrates of the present invention may be produced with flexibility in the surface topography design not bounded by current polishing and texturing processes. By the microbump deposition method of the present invention, AFM Rq can be controlled independently from AFM Rp and Rmax as well as the density of Rp's. The independent control allows for an optimum surface for achieving desirable soft error rates and flying characteristics with little trade-off required.

In the opposite-charge methods of Examples 1–3, a low concentration of colloidal silica was used, specifically 4%, 4% and 2% by volume respectively, compared to a high concentration of 88% by volume for the no-charge method of Example 4. It was generally observed that the opposite-charge method does produce a higher density of deposited particles even using the significantly lower concentration. However, this was expected given that the no-charge method relies upon Brownian motion and high silica concentration to achieve deposition. For the aluminum plus charge ion methods of Examples 1 and 2, the use of a higher pH of 4.5 resulted in the same or similar Rp, Rmax and Rmax:Rp to that observed with the lower pH of 3.5, but the 4.5 pH method deposited the colloidal silica to a greater density and caused a greater increase in the micro-roughness Rq. The iron plus charge ion method of Example 3 achieved lower particle density than the aluminum ion methods, but higher Rp, Rmax and Rmax:Rp. As stated above, the lowest density of deposited particles was observed in the no-charge method of Example 4, but the same or similar Rp, Rmax and Rmax:Rp were observed as compared to the aluminum plus charge ion method, and the least increase in the micro-roughness Rq was observed compared to all the methods. It may thus be appreciated that the method, the particle type, the particle concentration, the particle size, the substrate type, the surface conditioning and the pH may be selected and adjusted to achieve the desired results for a particular application.

While the above examples describe the invention using a glass substrate and colloidal silica spheres, the invention should not be so limited. Other surfaces suitable for use in magnetic recording disks may be used in the present invention. Ceramic, glass-ceramic and oxidized metal surfaces, for example, may be used rather than the glass surface. Also, alumina, alumina-coated silica, metal-ion-modified colloidal silica or other colloidal particles may be used rather than silica. Colloidal spheres provide homogeneous microbumps in accordance with the invention, with high controllability, however, it may be appreciated that non-spherical particles may be used if such particles may be deposited to provide a homogeneous microbump texture on the surface in a controlled fashion.

Figure 2:
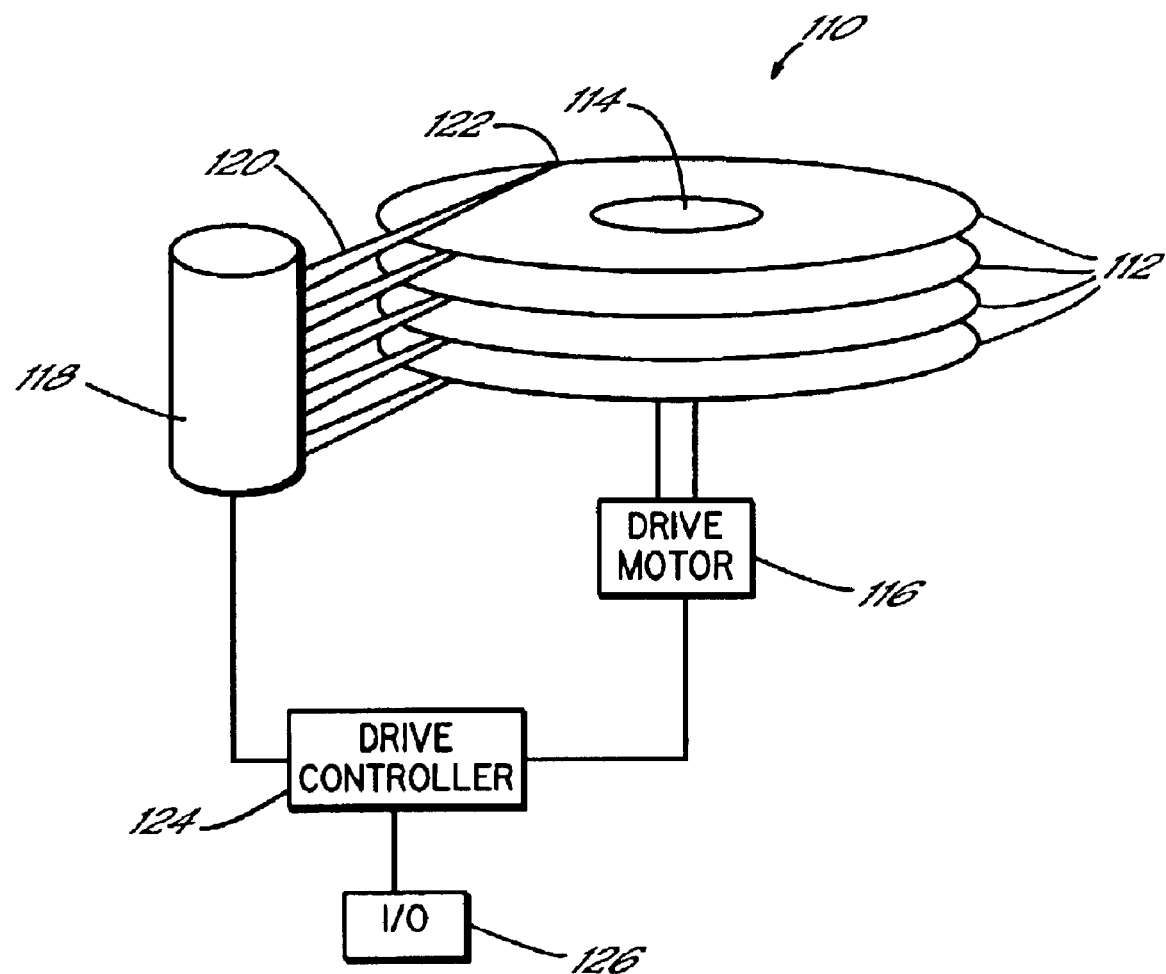
FIG. 2 is a functional block diagram of a disk drive product consistent with the invention.

FIG. 2 illustrates an exemplary disk drive 110 incorporating a plurality of rigid data storage disks 112 stacked coaxially in a tandem spaced relationship and rotated about a hub 114 driven by a drive motor 116. Disk drive 110 may incorporate any number of disks 112, with one or more of the disks incorporating a textured substrate of the present invention.

An actuator 118 includes one or more outwardly extending actuator arms 120, with each arm having one or more transducers/heads 122 mounted thereto for writing and reading information to and from the rigid data storage disks 112. The actuator 118 and drive motor 114 are driven by a drive controller 124 which coordinates rotation of the disks, movement of the actuator, and the transfer of data to and from the disks. Additional electronic circuitry may also be coupled to controller 124, e.g., input/output circuitry 126 utilized to communicate data between the disks and a computer or other electronic device with which the disk drive is interfaced.

Disk drive 110 may incorporate any number of known disk drive technologies, and may be used in a wide variety of applications, e.g., in a direct access storage device (DASD) system, a RAID system, a desktop hard drive, a portable hard drive, a removable hard drive, etc. Therefore, the invention is not limited to the particular implementations described herein.

While the present invention has been illustrated by the description of one or more embodiments thereof, and while the embodiments have been described in considerable detail, they are not intended to restrict or in any way limit the scope of the appended claims to such detail. For example, while magnetic disk substrates for computer disk drives have been described herein, the texturing method and disks of the present invention have application for any magnetic disk substrate benefitting from a textured surface for any ultimate end use, such as laser or microscope optics. The present invention is not intended to be limited to substrates for computer disk drives. Other additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicant's general inventive concept.

What is claimed is:

1. A method for texturing a substrate surface comprising:
   depositing a plurality of colloidal particles directly on a substrate surface having a surface micro-roughness Rq of about 10 Å or less to provide a Rp value of about 20–200 Å and a ratio of Rmax:Rp of about 1.4 or less.

2. The method of claim 1 wherein the substrate surface comprises glass.

3. The method of claim 1 wherein the colloidal particles are deposited at a density of at least about 25 particles per 25 $\mu m_2$.

4. The method of claim 1 wherein the depositing step increases the surface micro-roughness Rq, and wherein, after the depositing step, the micro-roughness Rq is below about 10 Å.

5. The method of claim 1 wherein, after the depositing step, the surface micro-roughness Rq is between about 3 Å and about 9 Å and the Rp value is between about 30 Å and about 100 Å with a particle density of about 25 to about 500 particles per 25 $\mu m^2$.

6. The method of claim 1 wherein the depositing step includes dipping the substrate surface in a colloidal silica solution to deposit spherical silica particles on the substrate surface.

7. The method of claim 6 further comprising adjusting the pH of the substrate surface and the colloidal silica solution to create a charge difference between the substrate surface and the silica particle surfaces to thereby deposit the spherical silica particles on the substrate surface.

8. The method of claim 7 wherein the substrate surface has a first isoelectric point and the silica particle surfaces have a second isoelectric point and wherein the pH of the substrate surface is adjusted to a value greater than about 0.5 pH units to the acid side of the first isoelectric point and the pH of the colloidal silica solution is adjusted to a value greater than about 0.5 pH units to the base side of the second isoelectric point.

9. The method of claim 7 wherein the substrate surface is alumino-silicate glass and the first isoelectric point is for the alumino-silicate substrate surface, and wherein the pH of the colloidal silica solution is adjusted to between about 3.0 and about 4.5.

10. The method of claim 6 further comprising adjusting the pH of the substrate surface and the colloidal silica solution to create a zeta potential of zero on both the substrate surface and the silica particle surfaces.

11. The method of claim 10 wherein the substrate surface is alumino-silicate glass and the pH of the colloidal silica solution is adjusted to between about 2 and about 3.

12. The method of claim 1 wherein the depositing step includes:
pre-cleaning the substrate surface in a caustic bath having a first pH of about 9.5–12.5;
then rinsing the substrate surface in a first solution having a second pH, wherein the second pH is (a) greater than about 0.5 pH units to the acid side of a first isoelectric point of a plus charge on the substrate surface, or (b) within about 0.5 pH units of a second isoelectric point of the substrate surface;
then dipping the substrate surface in a colloidal particle solution having a third pH, wherein the third pH is equal to or greater than the second pH, and wherein the third pH is (c) greater than about 0.5 pH units to the base side of a third isoelectric point of the colloidal particles, or (d) within about 0.5 pH units of the third isoelectric point of the colloidal particles;
then rinsing the substrate surface consecutively in one or more solutions having the third PH;
then rinsing the substrate surface one or more times in deionized water; and
drying the substrate surface.

13. The method of claim 12 wherein the second pH is (a) and the third pH is (c) and the third pH is equal to the second pH.

14. The method of claim 12 wherein the second pH is (a) and the third pH is (c) and the third pH is greater than the second pH.

15. The method of claim 12 wherein the second pH is (b) and the third pH is (d) and the third pH is equal to the second pH.

16. The method of claim 12 wherein the second pH is (a) and the third pH is (c) and further comprising, after the pre-cleaning step and before rinsing the substrate surface in the first solution:
rinsing the substrate surface in a first acidic solution,
then dipping the substrate surface in a second acidic solution comprising metal ions,
then rinsing the substrate surface in a third acidic solution, and
then rinsing the substrate surface in deionized water,
wherein the first, second and third acidic solutions have a pH sufficient to provide the metal ions on the substrate surface to provide a positive charge thereon.

17. The method of claim 16 wherein second acidic solution comprises metal ions selected from the group consisting of: iron, aluminum, cerium, zirconium, titanium, tin, chromium, nickel, manganese, zinc, gallium, yttrium, cobalt, copper, barium, strontium, calcium and magnesium.

18. The method of claim 1 wherein the depositing step includes:
pre-cleaning the substrate surface in a caustic bath having a first pH of about 9.5–12.5 and a temperature of about 50–70° C. for a time of about 0.5–20 minutes;
then rinsing the substrate surface in a first solution having a second pH greater than about 0.5 pH units to the acid side of the isoelectric point of the substrate surface and a temperature of about 20–70° C. for a time of about 3–20 minutes;
then dipping the substrate surface in a colloidal silica solution having a third pH greater than or equal to the second pH for a time of about 5–120 minutes;
then rinsing the substrate surface consecutively in one or more second solutions having the third pH and a temperature of about 20–100° C. for a time of about 3–5 minutes;
then rinsing the substrate surface in deionized water; and drying the substrate surface.

19. The method of claim 18 wherein the second pH is between about 3 and about 4.5.

20. The method of claim 19 wherein the third pH equals the second pH.

21. The method of claim 19 wherein the third pH is greater than the second pH and up to about 11.

22. The method of claim 18 further comprising providing the colloidal silica solution with the third pH by adjusting the pH of the solution with an ion exchange resin.

23. The method of claim 1 wherein the depositing step includes:
pre-cleaning the substrate surface in a caustic bath having a first pH of about 9.5–12.5 and a temperature of about 50–70° C. for a time of about 0.5–20 minutes;
then rinsing the substrate surface in a rinse bath having a temperature of about 20–70° C. for a time of about 3–20 minutes, the rinse bath selected from the group consisting of: a first acidic solution of a second pH of about 1.5–3 and deionized water;
then dipping the substrate surface in a second acidic solution having a concentration of 0.001–0.00001M ferric chloride and having the second pH for a time of about 3–30 minutes;
then rinsing the substrate surface in one or more third acidic solutions having the second pH and a temperature of about 20–70° C. for a time of about 3–20 minutes;
then rinsing the substrate surface one or more times in deionized water having a temperature of about 20–70° C. for a time of about 3–20 minutes;
then rinsing the substrate surface in one or more fourth acidic solutions having a third pH greater than about 0.5 pH units to the acid side of the isoelectric point of iron and a temperature of about 20–100° C. for a time of about 3–5 minutes;
then dipping the substrate surface in a colloidal silica solution having a fourth pH greater than or equal to the third pH for a time of about 5–120 minutes;
then rinsing the substrate surface consecutively in one or more fifth acidic solutions having the fourth pH and a temperature of about 20–100° C. for a time of about 3–5 minutes;
then rinsing the substrate surface in deionized water; and drying the substrate surface.

24. The method of claim 23, wherein the third pH is between about 3 and about 4.5.

25. The method of claim 23 further comprising providing the colloidal silica solution with the fourth pH by adjusting the pH of the solution with an ion exchange resin.

26. The method of claim 1 wherein the depositing step includes:
pre-cleaning the substrate surface in a caustic bath having a first pH of about 9.5–12.5 and a temperature of about 50–70° C. for a time of about 0.5–20 minutes;
then rinsing the substrate surface in a first solution having a second pH within about 0.5 pH units of the isoelectric point of the substrate surface and a temperature of about 20–70° C. for a time of about 3–20 minutes;
then dipping the substrate surface in a colloidal silica solution having a third pH within about 0.5 pH units of the isoelectric point of silica for a time of about 5–120 minutes;
then rinsing the substrate surface consecutively in one or more second solutions having the third pH and a temperature of about 20–100° C. for a time of about 3–5 minutes;

then rinsing the substrate surface in deionized water; and
drying the substrate surface.

27. The method of claim 1 wherein the plurality of colloidal particles are selected from the group consisting of spherical silica, spherical alumina, spherical alumina-coated silica, and metal-ion-modified colloidal silica.

28. The method of claim 27 wherein the plurality of colloidal particles have an average diameter of about 20–2000 Å.

29. The method of claim 27 wherein the plurality of colloidal particles have an average diameter of about 20–70 Å.

30. The method of claim 1 wherein the substrate surface is selected from the group consisting of glass, ceramic, glass-ceramic and oxidized metal.

31. The method of claim 1 wherein the plurality of colloidal particles are deposited on a glass substrate surface having an anisotropic diamond texture with the surface micro-roughness Rq of about 10 Å or less and an initial Rmax:Rp of 1.5 or greater.

32. The method of claim 1 wherein the plurality of colloidal particles are deposited on a glass substrate surface having an isotropic superfinish with the surface micro-roughness Rq of about 4 Å or less and an initial Rmax:Rp of 1.5 or greater.

33. A method for texturing a glass substrate surface comprising:
  immersing a surface of a glass substrate having a micro-roughness Rq of about 4 or less, a Rp value less than about 20 Å, and a Rmax less than about 30 Å in a caustic bath having a first pH between about 9.5 and about 12.5;
  then immersing the glass substrate surface in a first acidic solution having a second pH of between about 3 and about 4.5;
  then immersing the glass substrate surface in a colloidal silica solution having the second pH and comprising spherical silica particles of average diameter between about 20–2000 Å for a time sufficient to deposit a plurality of the spherical silica particles on the glass substrate surface at a density of at least about 25 particles per 25 $\mu m^2$; and
  then rinsing the glass substrate surface having the spherical silica particles deposited thereon in a second acidic solution having the second pH,
  wherein, after the rinsing step, the glass substrate surface has a Rp value of about 20–200 Å and a ratio of Rmax:Rp of about 1.4 or less.

34. The method of claim 33 wherein the immersing in colloidal silica solution and rinsing steps increase the surface micro-roughness Rq, and wherein, after the rinsing step, the micro-roughness Rq is below about 10 Å.

35. The method of claim 34 wherein, after the rinsing step, the surface micro-roughness Rq is between about 3 Å and about 9 Å and the Rp value is between about 30 Å and about 100 Å with a particle density of about 25 to about 500 particles per 25 $\mu m^2$.

36. The method of claim 33 further comprising providing the colloidal silica solution with the second pH by adjusting the pH of the solution with an ion exchange resin.

37. The method of claim 33 wherein the spherical silica particles have an average diameter of about 20–70 Å.

38. A method for texturing a glass substrate surface comprising:
  immersing a surface of a glass substrate having a micro-roughness Rq of about 4 Å or less, a Rp value less than about 20 Å, and a Rmax less than about 30 Å in a caustic bath having a first pH between about 9.5 and about 12.5;
  then immersing the glass substrate surface in one or more first acidic solutions having a second pH of between about 1.5 and about 3;
  then immersing the glass substrate surface in a second acidic solution having a concentration of 0.001–0.00001M ferric chloride and having the second pH;
  then immersing the glass substrate surface in one or more third acidic solutions having the second PH;
  then immersing the glass substrate surface in a fourth acidic solution having a third pH of between about 3 and about 4.5;
  then immersing the glass substrate surface in a colloidal silica solution having the third pH and comprising spherical silica particles of average diameter between about 20–2000 Å for a time sufficient to deposit a plurality of the spherical silica particles on the glass substrate surface at a density of at least about 25 particles per 25 $\mu m^2$; and
  then rinsing the glass substrate surface having the spherical silica particles deposited thereon in one or more fifth acidic solutions having the third pH,
  wherein, after the rinsing step, the glass substrate surface has a Rp value of about 20–200 Å and a ratio of Rmax:Rp of about 1.4 or less.

39. The method of claim 38 wherein the immersing in colloidal silica solution and rinsing steps increase the surface micro-roughness Rq, and wherein, after the rinsing step, the micro-roughness Rq is below about 10 Å.

40. The method of claim 39 wherein, after the rinsing step, the surface micro-roughness Rq is between about 3 Å and about 9 Å and the Rp value is between about 30 Å and about 100 Å with a particle density of about 25 to about 500 particles per 25 $\mu m^2$.

41. The method of claim 38 further comprising providing the colloidal silica solution with the second pH by adjusting the pH of the solution with an ion exchange resin.

42. The method of claim 38 wherein the spherical silica particles have an average diameter of about 20–70 Å.

43. A method for texturing a glass substrate surface comprising:
  polishing and texturing a glass substrate surface to provide an anisotropic diamond texture having a first surface topography including a first micro-roughness Rq of about 10 Å or less, a first Rp value less than about 30 Å, a first Rmax less than about 85 Å and a first Rmax:Rp of 1.5 or greater;
  depositing a plurality of colloidal spherical particles directly on the glass substrate surface to provide a second surface topography including a second micro-roughness Rq of 10 Å or less, a second Rp value of about 20–200 Å and a second Rmax:Rp of about 1.4 or less.

44. The method of claim 43 wherein the particles are deposited at a density of at least about 25 particles per 25 $\mu m^2$.

45. The method of claim 43 wherein the depositing step includes dipping the substrate surface in a colloidal silica solution to deposit spherical silica particles on the substrate surface.

46. A method for texturing a glass substrate surface comprising:
  polishing a glass substrate surface to provide an isotropic smooth superfinish having a first surface topography including a first micro-roughness Rq of about 4 Å or less, a first Rp value less than about 20 Å, a first Rmax less than about 30 Å and a first Rmax:Rp of 1.5 or greater;

depositing a plurality of colloidal spherical particles directly on the glass substrate surface to provide a second surface topography including a second micro-roughness Rq of 10 Å or less, a second Rp value of about 20–200 Å and a second Rmax:Rp of about 1.4 or less.

47. The method of claim 46 wherein the particles are deposited at a density of at least about 25 particles per 25 $\mu m^2$.

48. The method of claim 46 wherein the depositing step includes dipping the substrate surface in a colloidal silica solution to deposit spherical silica particles on the substrate surface.

* * * * *